United States Patent
Dang et al.

(10) Patent No.: US 9,916,158 B2
(45) Date of Patent: Mar. 13, 2018

(54) COGNITIVE FEATURE ANALYTICS

(71) Applicant: International Business Machines Corporation, Armonk, NY (US)

(72) Inventors: Ya Bin Dang, Beijing (CN); Qi Cheng Li, Beijing (CN); Shao Chun Li, Beijing (CN); Guang Tai Liang, Beijing (CN); Xin Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 15/214,589

(22) Filed: Jul. 20, 2016

(65) Prior Publication Data

US 2018/0024832 A1    Jan. 25, 2018

(51) Int. Cl.
    *G06F 9/44*    (2006.01)
(52) U.S. Cl.
    CPC .  *G06F 8/74* (2013.01); *G06F 8/71* (2013.01)
(58) Field of Classification Search
    CPC ....................................................... G06F 9/44
    USPC ............................................... 717/104–109
    See application file for complete search history.

(56) References Cited

U.S. PATENT DOCUMENTS

| | | | |
|---|---|---|---|
| 7,747,988 B2 | 6/2010 | Zhu et al. | |
| 2009/0048856 A1* | 2/2009 | Howell | G06Q 10/06 705/305 |
| 2009/0048950 A1* | 2/2009 | Howell | G06Q 10/06 705/30 |
| 2009/0049094 A1* | 2/2009 | Howell | G06Q 10/10 |
| 2014/0370488 A1* | 12/2014 | Kapoor | G09B 7/02 434/362 |
| 2015/0046286 A1* | 2/2015 | Erb | G06Q 30/0623 705/26.61 |
| 2017/0286192 A1* | 10/2017 | Thomas | G06F 9/546 |

OTHER PUBLICATIONS

Akhtar et al., "Requirement Analysis, Architectural Design and Formal Verification of a Multi-Agent Based University Information Management System", International Journal of Computer Science & Information Technology (IJSCIT) vol. 6, No. 5, Dec. 2014, pp. 73-81.

(Continued)

*Primary Examiner* — Jae Jeon
(74) *Attorney, Agent, or Firm* — Scully, Scott, Murphy & Presser, P.C.; Keivan Razavi, Esq.

(57) ABSTRACT

A system and method to build feature evolution models for existing applications ("apps") in the market based on open app data repositories). A feature evolution model of an app depicts the app name, its historical versions (historical version labels, release timestamps of each version), rating values of each version, and structured features (e.g., umbrella features and low-level features) each version introduces, improves or deletes. There is further extracted from the app description and release logs the app name, historical version labels, release timestamps, use the rating info of the app to extract and assign rating values for each version of the app, and apply NLP techniques and source code analysis techniques to extract "structured features" of the app through analyzing the app description, the release logs, and corresponding source code revisions of the app. Upon the built feature evolution models, various feature insights may be easily extracted and generated.

14 Claims, 11 Drawing Sheets

(56) References Cited

OTHER PUBLICATIONS

Brace et al., "CORAMOD: a checklist-oriented model-based requirements analysis approach", Department of Engineering Design and Production, Aalto University School of Science and Technology, Aalto, Espoo, Finland, Published online: Apr. 25, 2012, Springer-Verlag, London Limited 2012, pp. 1-26.

Chouder et al., "Requirement Analysis in Data Warehouses to Support External Information", Book Title: Computer Science and Its Applications, Proceedings 5th IFIP TC 5 International Conference, CIIA 2015, Saida, Algeria, May 20-21, 2015, pp. 243-253.

He et al., "An Automatic Software Requirement Analysis Approach Based on Intelligent Planning Technology", Journal of Software, vol. 9, No. 11, Nov. 2014, pp. 2861-2867.

Mitakides et al., "Validating Business Requirements Using MAS Analysis Models", Proceedings of the 14th International Conference on Autonomous Agents and Multiagent Systems (AAMAS 2015), May 4-8, 2015, Istanbul, Turkey, pp. 1693-1694.

Albers et al., "Using Timing paths to validate end-to-end requirements with methods of schedulability simulation and analysis", 1st International Workshop on Requirements Engineering for Self-Adaptive and Cyber Physical Systems, Essen, Germany, Mar. 23, 2015, pp. 198-205.

Phalnikar et al., "Analysis of Conflicting User Requirements in Web Applications Using Graph Transformation", ACM SIGSOFT Software Engineering Notes, Mar. 2015, vol. 40, No. 2, pp. 1-7.

Shaffiei et al., "Requirement Analysis of E-Content for Visual Learners", Short Paper, http://www.i-jet.org, http://dx.doi.org/10.3991/ijet.v9i1.3072, Mar. 2014, pp. 78-81.

\* cited by examiner playlist.me

*http://playlist.me/wl.php* — 131

Features

- Continuous Playback on your website
  usic the background without interruption as visitors browse pages
- Complete Music Con
  use next previous seek shuffle reneat mode volume and more
- Range of Controller webpages
  MPFM has a lot of common featurers with other music players, such as gapless playback, support for most popular sound formats, tagging, etc. However, it also has a lot of unique features that most musicians will enjoy. Here are some of the most powerful features of MPFm:
- Custom CSS Desing
- Dynamic Plailist - M
  - Filter L
    Most audi format as
- Flexible UI - Dockab
  - Time Shi
    Picking u from 50%
- Design Wizard -Eas
  - Loops
    You are p practice
  - Markers
    You can c

— 141

*http://musicplayerformusicians.com/features* — 132 foobar2000

Main features

- Supported audio formats: MP3, Mp4, AAC, CD Audio, WMA, Vorbis, Opus, FLAC, WavPack, WAV, AIFF, Musepack, Sprrx, AU, SND... and more with additional components:
- Gapless playback.
- Easily customizable user interface layout.
- Advance tagging capabilities.
- Support for ripping Audio CDs as well as transcoding all supported audio formats using the Converter component.
- Full ReplayGain support.
- Customizable keyboard shortcuts.
- Open component architecture allowing third-party developers to extend funtionality of the player.

*http://www.foobar2000.org/* — 143 s (see list below). However, none let you filter your library by sound

COGNITIVE FEATURE ANALYTICS

FIELD

The present disclosure relates to software development and feature selection for applications being developed, and more particularly, to a system and a method to build feature evolution models for existing apps in the market and apply NLP techniques and source code analysis techniques to extract "structured features" of the application from which various feature insights could be easily extracted and generated.

BACKGROUND

To deliver any software application product, feature analytics are usually needed to manually explore, specify, prioritize software features to implement. Without right features, the software may fail to win in the market.

FIG. 1 shows one traditional feature analysis approach 50 to cognitive (software) engineering. Here, a feature analyst 52 largely receives non-guided communications to generate features for a software product, e.g., for a music player, what potential features are needed to be provided? Such non-guided communications received by the analyst may include but are not limited to: communications via mails/e-mails 60, communications via meetings 63, communications via phones 66, and generates a feature analysis report 75. Such a process 50 depicted in FIG. 1 heavily depends on the expertise, capability, and even body status of requirement analytics. The process is usually with low efficiency and generates ineffective feature report (i.e., of unguaranteed quality).

Further approaches focus on validation of given specific requirements on specific characteristics (e.g., confliction) and may focus on exploring proper requirement analysis for special systems (e.g., multi-agent based applications).

In one known approach, there is applied automatic plan technology to help capture/understand a given requirement specification more accurately and completely. However, this prior art approach requires a given requirement specification from users.

Additionally, one approach proposes to use checklists to enable a conscious and systematic approach to identify software requirements, e.g., to define a requirement more accurately.

SUMMARY

According to a first aspect, there is provided a "smart" system and method and computer program product to accelerate and further improve a feature analysis process, the improvement leading to improved design features and/or new products.

The system automatically and intelligently learns features of an available product, e.g., a software product. Based on the summarized feature hub, the system can enable feature analytics to have an expert-guided, efficient, quality-guaranteed feature analysis process.

In accordance with this aspect, the system and method provide for the auto-extraction of features, and summarization of features from arbitrary data such that complete requirement sets can be recommended (and not just about the understanding of the completeness of a single requirement) to users to accelerate their analysis process.

In one embodiment, there is provided a method for improving features of a product. The method comprises: obtaining, at a programmed processor, data relating to features of an existing product; building, using the programmed processor, a behavior evolution model of the product based on the features data, the behavior evolution model comprising one of more structured features and a feature's fine-grained relationship with other related entities; computing, using the programmed processor, one or more insights for users' preferences based on the behavior evolution model; and designing a future product or improving an existing product based on the one or more computed insights for users' preferences.

According to a further embodiment, there is provided a system for improving features of a product. The system comprises: a processor and a computer-readable memory coupled to the processor, wherein the memory comprises instructions which, when executed by the processor, cause the processor to: obtain data relating to features of an existing product; build a behavior evolution model of the product based on the features data, the behavior evolution model comprising one of more structured features and a feature's fine-grained relationship with other related entities; compute one or more insights for users' preferences based on the behavior evolution model; and design a future product or improve an existing product based on the one or more computed insights for users' preferences.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE SEVERAL VIEWS OF THE DRAWINGS

Embodiments are described in more detail in conjunction with the accompanying drawings, in which:

FIG. 9 shows example web-pages and/or on-line descriptions of products, such as software products in the context of a music player product and music player software applications.

DETAILED DESCRIPTION

The present disclosure provides a feature insight analysis framework, which automatically builds behavior evolution models of existing products, e.g., hardware or software applications, and then based on behavior evolution models, provide the ability to extract various insights for users' references to enable an efficient, guided and completed feature analysis process for feature analytics. The feature analysis can be used to design new products or further refine/improve existing products.

In an exemplary embodiment, for software projects, before developing software application code, project teams need to decide what features should be provided at what priorities. The feature evolution histories of similar software projects provide good reference bases to accelerate their decision-making processes (e.g., help project teams identify what features are surprising ones or failure ones). A specification method and building approach of feature evolution models for existing applications in the market based on open application ("app") data (e.g., available data in app stores or open source code repositories) is provided.

Figure 1:
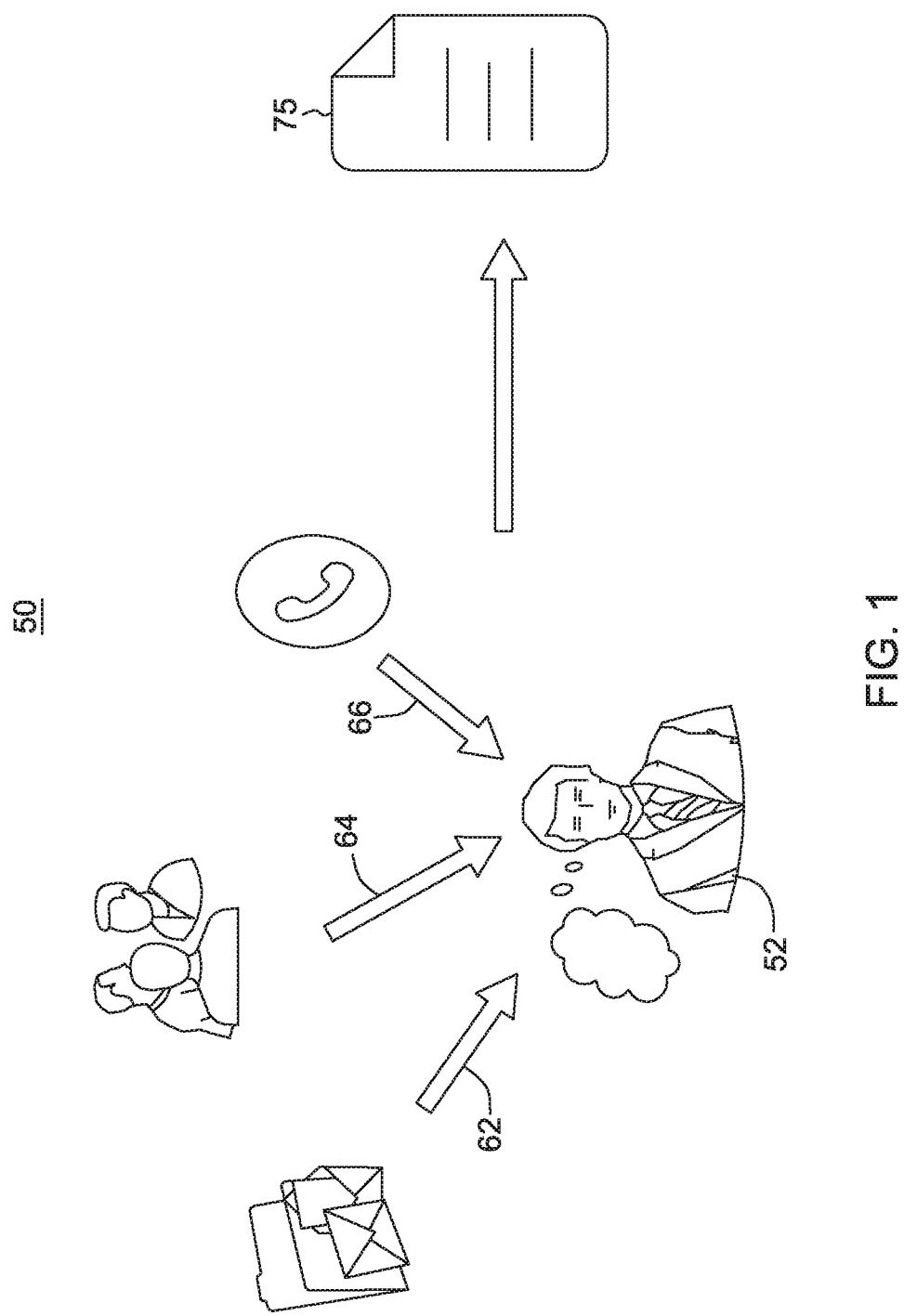
FIG. 1 conceptually depicts a prior art approach for generating features for software products and generation of a feature analysis report.
Figure 2:
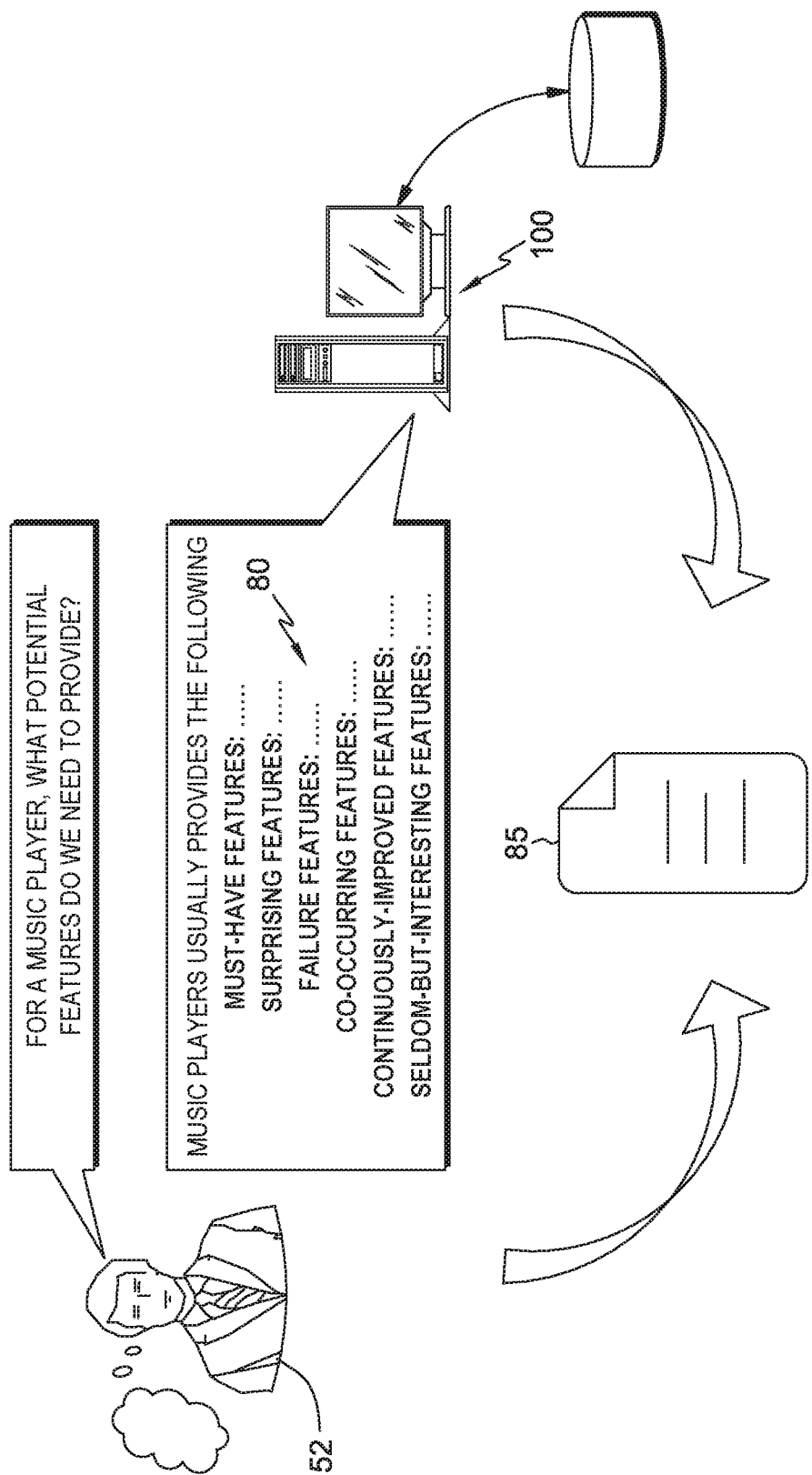
FIG. 2 conceptually depicts an approach to cognitive (software) engineering using feature insight analysis run by computing system according to one embodiment.

FIG. 2 conceptually shows an approach to cognitive (software) engineering using feature insight analysis, wherein a computing system 100 is configured to run methods to auto-generate an initial version of the features 80 needed to be provided which an analyst 52 of FIG. 1 can then further polish and refine to produce a final feature analysis report 85.

Figure 3:
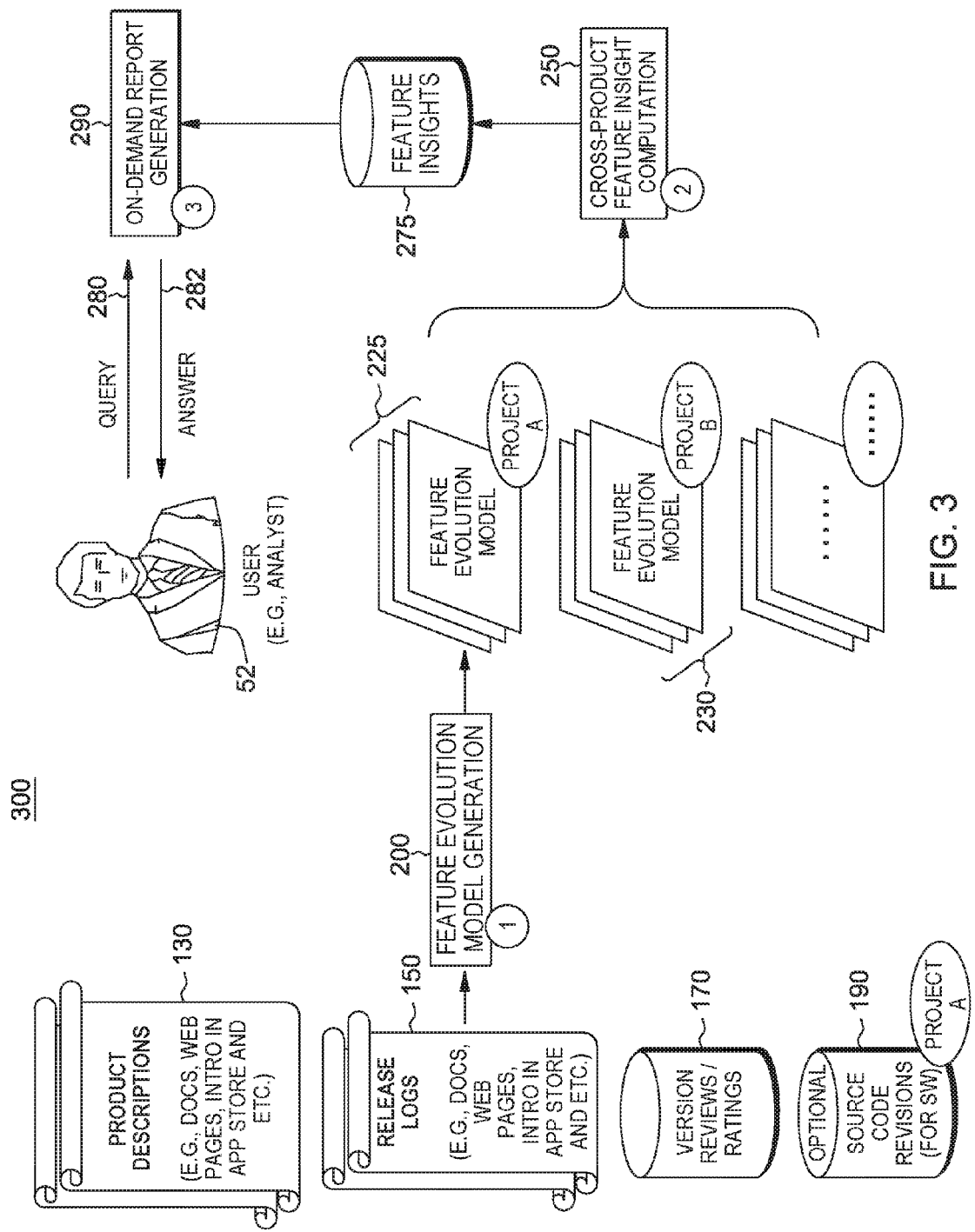
FIG. 3 shows an overview of the system implementing methods for cognitive (software) engineering using feature insight analysis according to one embodiment.

FIG. 3 shows an overview of the system 300 implementing methods for cognitive (software) engineering using feature insight analysis. For non-limiting purposes of description, an example feature insight analysis is performed in the context of potential features for a music player product and music player software application such as shown in FIG. 2.

According to an exemplary embodiment, computing system 300 runs a feature evolution model generator module 200, that receives inputs such as product descriptions 130, product release logs 150, and additional information such as product version reviews and/or ratings 170 and optionally, source code revisions 190, e.g., for a software product.

In one embodiment, system 300 performs methods for building feature evolution models 225 for existing applications (hereinafter "apps") in the market, e.g., based on the product descriptions 130 (e.g., documents, web pages, introductions for products provided in an on-line "app" store, etc.) and release logs 150 (e.g., docs, web pages, intro in app store, etc.). Additional information used by the feature evolution model generator module 200 to build a feature evolution model may include open application data, e.g., available data in application (hereinafter "app") stores, or open source code repositories 190.

FIG. 9 shows example web-pages and/or on-line descriptions of products, such as software products in the context of a music player product and music player software applications 131, 132 and 133 such as shown in FIG. 2 from which feature related description units, e.g., "snippets" 141, 142 and 143, respectively, may be extracted for the feature evolution model build according to the embodiments herein.

In one embodiment, system 100 further includes a cross-product feature insight computation module 250 that receives one or more feature evolution models 225, 230, etc. and performs methods for computing insights into cross-product features. Any of the generated feature insights may be stored in a memory, e.g., a database system 275. System 200 further includes an on-demand report generation module 290 which is configured to receive queries from users, e.g., a query 280 from analyst 52, generates reports and provides answers 282 to the query. Such a query received at the on-demand report generation module 290 may be a request to obtain feature insights in the design of a new software or hardware product or new version thereof.

Figure 4:
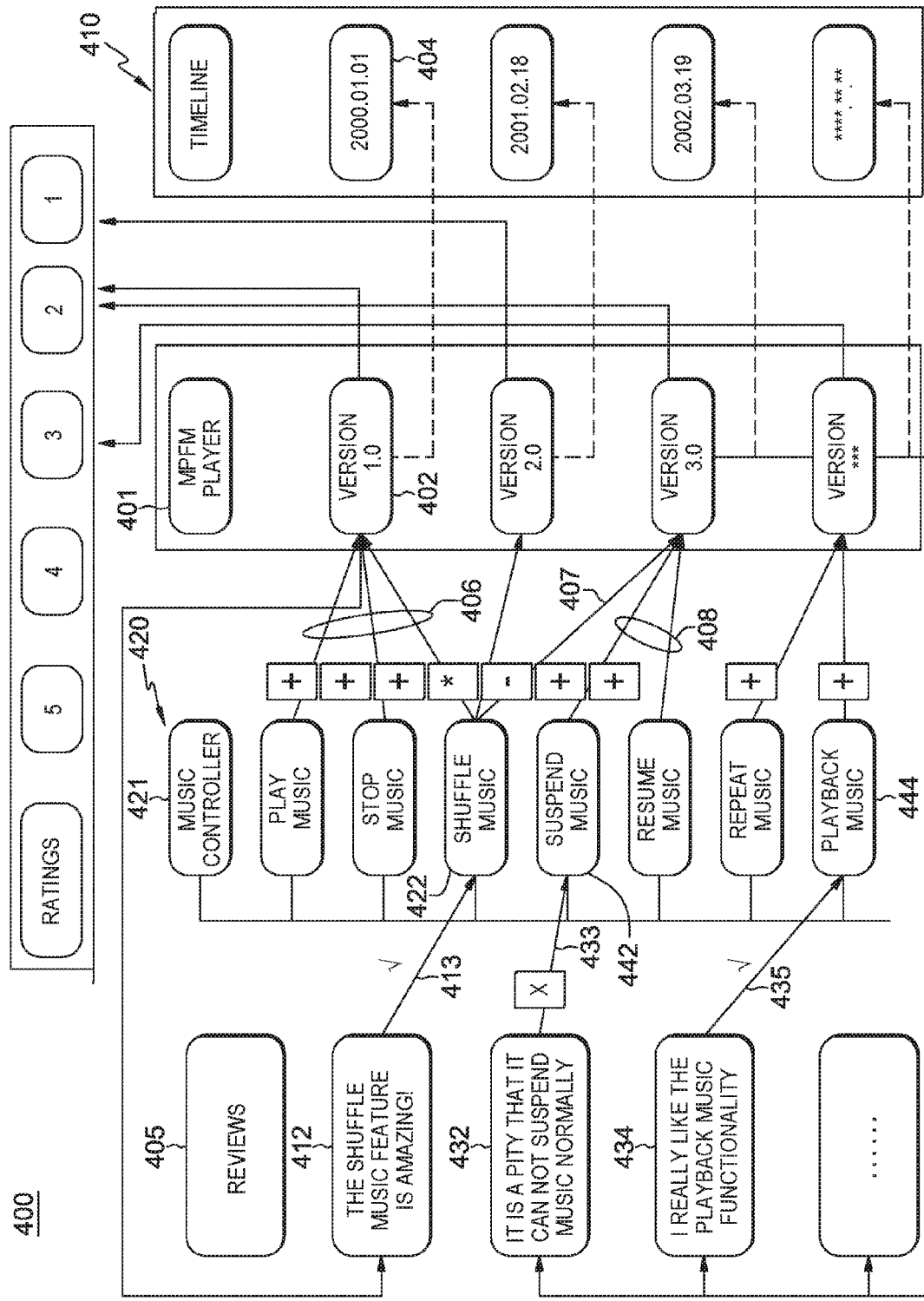
FIG. 4 depicts a non-limiting example of a feature evolution model and feature tree structure generated by the feature evolution model generator module.

FIG. 4 depicts a non-limiting example of a feature evolution model and feature tree structure generated by the feature evolution model generator module 200. In the example embodiment depicted in FIG. 4, a feature evolution model 400 is generated for a software product. As shown in FIG. 9, for example, a software product typically has release notes to show the version and all features in the version. For purposes of illustration, released versions and corresponding features are for an example music player for musicians (MPfm) software program 401. In one embodiment, the feature evolution model 400 built for the example software program 401 includes a feature tree (FT) 420 having several umbrella features (UF) such as a music controller umbrella feature 421, and several other umbrella features, e.g., play, stop, shuffle, suspend, resume, repeat, etc.

As each version of the MPfm software program is released over time 410, the system tracks and records reviews 405 that may be received by customers, e.g., over the product web-site, or as reviewed by critics in issued publications or blogs. These reviews are immediately associated with the relevant features and are tracked so as to record the evolution of the recorded features and ratings. The reviews are associated with particular product features such as shown as the types of umbrella features provided in the MPfm software program feature tree 420. Thus, in an example shown, a software version 402 (e.g., software Version 1.0) is shown released at a corresponding time 404 (e.g., as recorded and tracked by a year-month-day timestamp) and similarly for Versions 2.0, 3.0 etc., as shown. Different versions will add (+), remove (−) or update (*) the features of the software. Version 1.0 software release is shown to include features 406 such as play music, stop music or shuffle music. Software release Version 2.0 is shown having an updated shuffle feature and release Version 3.0 for example, shows the removal of the shuffle feature 307 however the addition of two more additional features 308, e.g., suspend and resume features. These changes to the version may be reflected as a "change label" showing that "Suspend music" "Resume music" are added and "Shuffle music" has been removed.

When user download the software from app store, they will give comments and rate it. And for each software release version, the system records the review comments, the particular feature reviewed and the review type, e.g., positive review/comment (√) or negative/comment (X) for the particular features and any associated ratings. For example of method 400, over time, the system records (tracks) release dates (e.g. from release date timestamps) for the Version 1.0 software release 402 and any associated review, e.g., review 412 such as may be obtained from a customer review at a web-site or in a social media forum. The review 412 indicates a positive review 413 for a particular feature, e.g., playback shuffle feature 422. Similarly, subsequent to release of the example MPfm software release Version 3.0, there appeared issuance of at least two reviews 432, 434 relating to the software program features relating to its suspend function 442 and playback function 444, for example. For example, the review 432 indicates a negative review 433 for a particular feature, e.g., suspend feature 442. The review 434 indicates a positive review 435 for a particular feature, e.g., playback feature 444.

With respect to the recording of associated ratings, the user/customer may give different rating for each version. Thus, as shown, the recorded rating for software release Version 1.0 is a Rating 2 and similarly software release Version 3.0 is further shown having a rating of 2. Software release Version 2.0 is shown to have a rating of 1.

With this information depicted in FIG. 4, the system generates the "Feature Evolution Model" for the example MPfm software product. The feature evolution model of FIG. 4 additionally depicts the tracking of one of more structured features (e.g., umbrella features and low level features) in the feature tree structure generated by the feature evolution model generator module 200, and also their fine-grained relationships with other related entities (e.g., application versions, user ratings, and release timestamps).

While a Feature Evolution Model is shown for a software product it is understood that the system may generate the "Feature Evolution Model" for hardware devices. For example, a Feature Evolution Model may be generated for a mobile phone device such as an iPhone®, in which versions (1.0, 3G, 3GS, 4, 4S etc.) show an evolution of features, including but not limited to: a capacitive screen, fuselage (aluminum), multi-point touch screen, camera, GPS system, App store, Double-sided glass, Siri®, etc., with reviews and ratings received and tracked similarly.

Books and movies upon release typically have a website and a launch event to show their features. User and audience show their comments and rating at a forum. Based on this information, a "Feature Evolution Model" for books and movies can be built as well. For example, for an evolution model created for a book, the book may have several versions (e.g., Versions 1, 2 and 3) over a span of time. For an example book directed to object-oriented analysis and design, the versions may show an evolution of features, including but not limited to: complexity, objects and classes, representation, application-data collection, application framework, UML 2.0, application—advanced system architecture, etc., with reviews and ratings received and tracked similarly.

In further embodiments, Feature Evolution Models may be generated for a movie, wherein the movie may have several versions (e.g., Versions 1, 2 and 3) released over a span of time. For an example movie (e.g., relating to a Book "A"), the versions may show features, including but not limited to: Story a, Story b, Story c, Story d, Story e, Story f, Story g, etc., with reviews and ratings received and tracked similarly.

Figure 5:
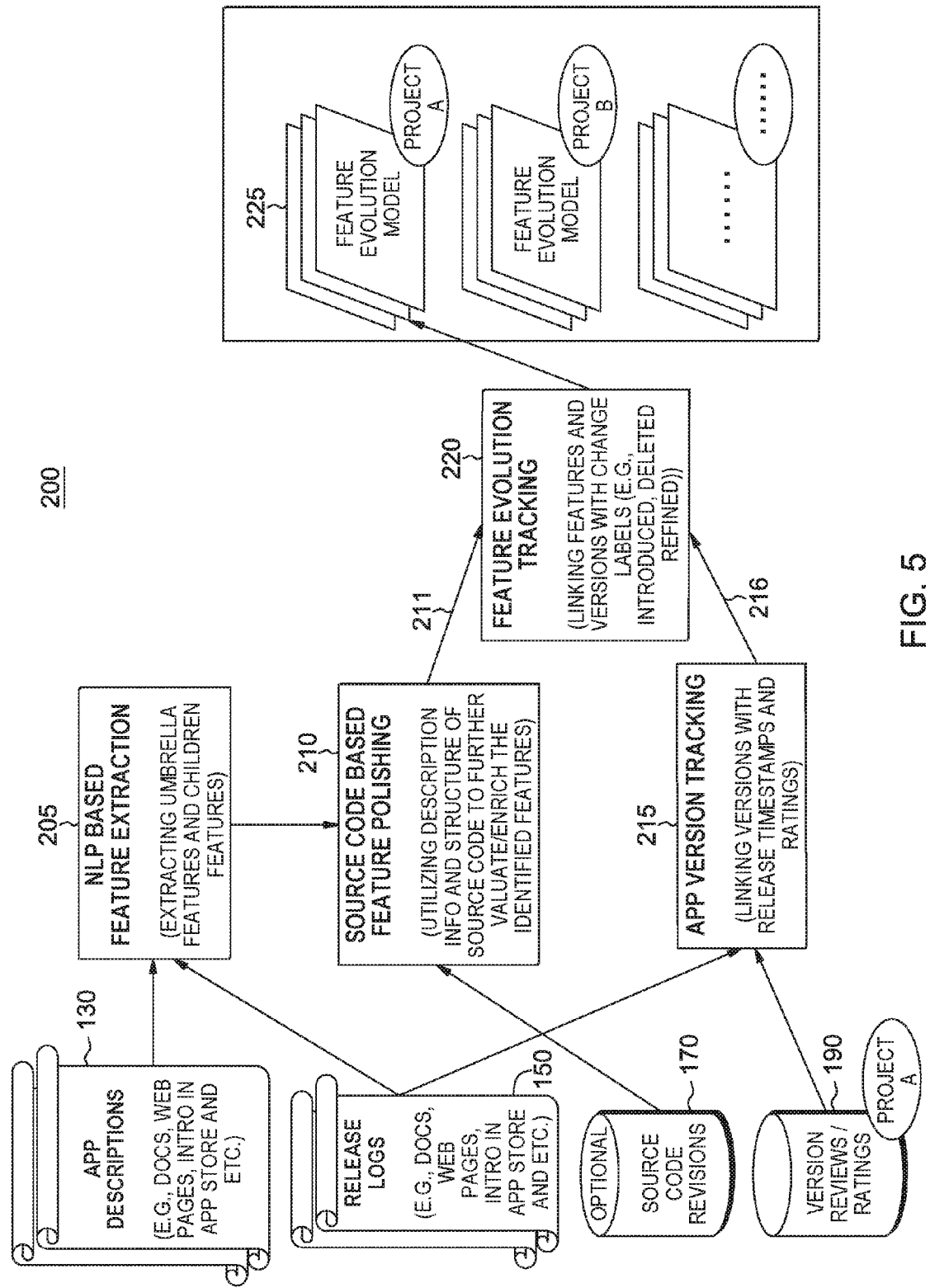
FIG. 5 shows one embodiment of a methodology for feature evolution model generation as shown in FIG. 2.

FIG. 5 shows a methodology 200 for feature evolution model generation as shown in FIG. 2. Feature Evolution Models are based on the data tracked as shown depicted by example in FIG. 4, including the product descriptions 130 (e.g., documents, web pages, intro in an app store, etc.) and release logs 150 (e.g., docs, web pages, intro in app store, etc.), product version reviews and/or ratings 170 and optionally, source code revisions 190, e.g., for a software product.

In one embodiment, a feature evolution model of a software application or "app" clearly depicts the app name, its historical versions (historical version labels, release timestamps of each version), rating values of each version, and structured features (e.g., umbrella features and low-level features) each version introduces, improves or deletes.

To build a feature evolution model for an app, the app description and release logs are accessed to extract the app name, historical version labels, release timestamps, and the ratings information of the app is used to extract and assign rating values for each version of the app, and apply NLP techniques and source code analysis techniques to extract "structured features" (umbrella features and children features) of the app through analyzing the app description, the release logs, corresponding source code revisions of the app.

Thus, as shown in FIG. 5, methodology 200 for feature evolution model generation first includes at 205 invoking Natural language processing (NLP) techniques to extract umbrella features and child features from the application descriptions data 130 and/or release logs data 150 for that product. Then, at 210, there is provided a step of Source Code Based Feature Polishing which utilizes description information and structure of source code/revisions 170 to further evaluate/enrich the features identified at 205. Concurrently or subsequently, the system implements methods 215 for application version tracking which involves linking versions of releases with release timestamps and ratings based on the release logs data 150 and version review/ratings data 190.

Based on the NLP-based extracted features and the source code based feature polishing outputs of evaluated and/or enriched features 211, and based on the release 'versions" linked by timestamps and corresponding ratings output 216, a method step 220 is invoked to track the evolution of features. This is depicted in FIG. 4, which shows the linking features and versions with change labels (e.g., introduced, deleted refined)). The feature evolution tracking step 220 implements methods to link the features and versions with "change labels" (Each version has a "change labels" to show which feature is added, which feature is updated and which feature is removed) and outputs a generated feature evolution model 230. Upon the build of the feature evolution model(s), various feature insights could be easily extracted and generated (e.g., "must-have" features, "surprising" features, "failure" features," co-occurring" features, continuously-improved features, seldom-but-interesting features). Thus, when the software company wants to build similar software, the company will know how to define the requirements to meet the good features and avoid the failed features.

In one embodiment, the feature evolution model 225 is shown associated with a "Project A," and a second feature evolution model 230 is shown as associated with a "Project B." "Project A" and "Project B" may be the same type of product (e.g., music controller software), however the correspond to different products (e.g., Music controller A and music controller B).

Figure 6:
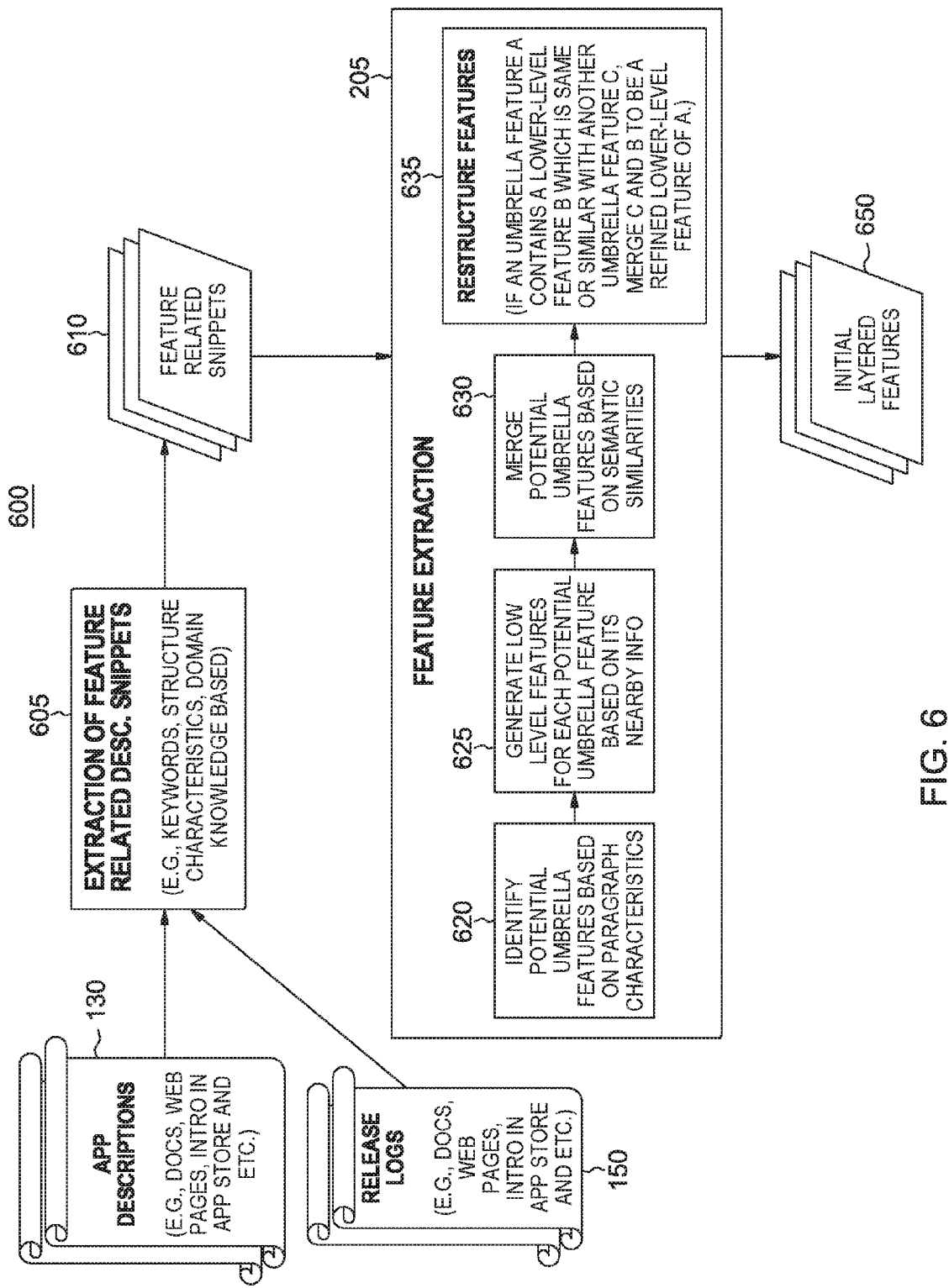
FIG. 6 depicts a reference algorithm for NLP-based feature extraction according to one embodiment.

FIG. 6 depicts a reference algorithm 600 for NLP-based feature extraction. As indicated, a first step 605 accesses stored product descriptions 130 (e.g., documents, web pages, intro in an app store, etc.) and release logs 150 (e.g., docs, web pages, intro in app store, etc.) and extracts features of related description portions or snippets. The extracted feature related snippets 610 may include, but are not limited to: e.g., keywords, structure characteristics, and are domain knowledge based.

From the extracted feature related snippets 610, method 600 invokes feature extraction steps 205 including a first step 620 of identifying potential umbrella features based on paragraph characteristics. The extraction of features that identify paragraph characteristics may be based on recognition of bold fonts, bullet item titles, identify high-level umbrella features, e.g., Music Controllers, Loops, etc. for the example MPfm software product. Then, continuing to 625, the method generates low level features for each potential umbrella feature based on its nearby information. For the example MPfm software product, there may be extracted low-level features of each umbrella feature, e.g., for the umbrella feature "Music Controllers", get low-level features "play music", "stop music", "suspend music" and etc. Continuing to step 630, further methods are invoked to merge potential umbrella features based on semantic similarities. That is, for similar umbrella features (e.g., music controllers, music operations), these may be merged as one umbrella feature.

Continuing further to 635, features may then further be restructured. For example, if an umbrella feature A contains a lower-level feature B which is same or similar with another umbrella feature C, merge C and B to be a refined lower-level feature of A. As a further example, an umbrella feature A contains B; B is also a umbrella feature and contains low-level feature C. These features may then be merged as a multiple layered feature. Thus, in one embodiment, the output of the feature extraction step 205 includes initial layered features 650 for the product (software, hardware, book or movie).

Figure 7:
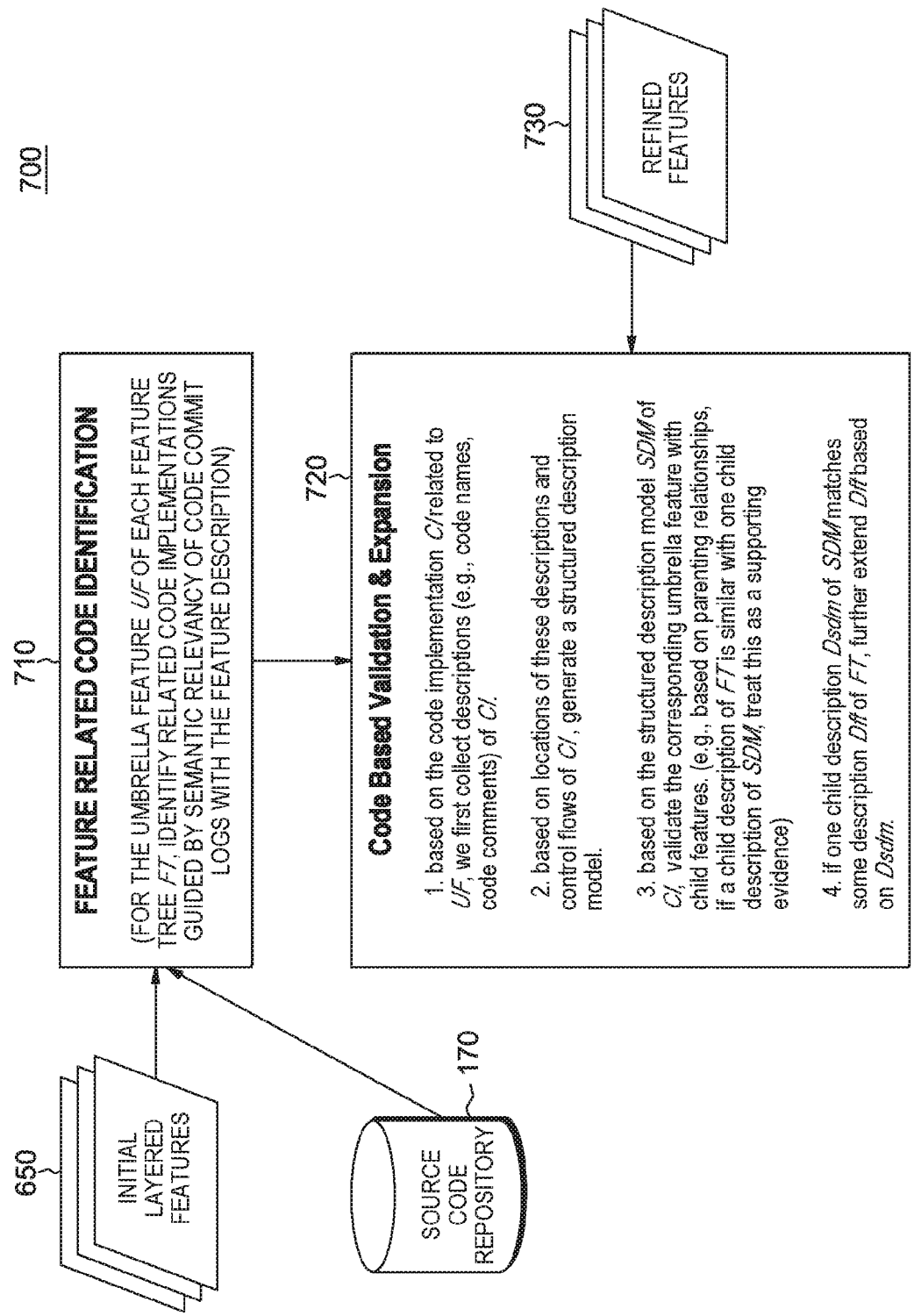
FIG. 7 depicts a reference algorithm for Source Code based feature polishing step of FIG. 5 according to one embodiment.

FIG. 7 depicts a reference algorithm 700 for Source Code based feature polishing step 210 of FIG. 5, according to one embodiment. The reference algorithm is to "polish" the features. For an example software product, the method builds a feature tree, e.g., a high level feature as the trunk node and a low level feature as the leaf node. Natural language mining is then used to parse the code to build the feature tree. The feature tree can polish the features extracted from other sources such as release notes, product introductions etc. As indicated in FIG. 7 a first step 705 includes a process for identifying feature related code based on the obtained initial layered features 650 and additionally based on any the source code revisions from repository 170. For example, for an umbrella feature UF of each feature tree FT, the method identifies related code implementations CI guided by semantic relevancy of code commit logs with the feature description. Then, there is performed a Code Based Validation and Expansion step 720 that perform the following: 1) based on the code implementation CI related to UF, first collecting descriptions (e.g., code names, code comments) of the CI; 2) based on locations of these descriptions and control flows of CI, generating a structured description model; 3) based on the structured description model (SDM) of CI, validating the corresponding umbrella feature with child features. (e.g., based on parenting relationships, if a child description of FT is similar with one child description of SDM, this is treated as a supporting evidence); and 4) if one child description Dsdm of SDM matches some description Dft of FT, further extending Dft based on Dsdm. In one embodiment, this processing requires an input of refined features 730.

For example, given the feature tree 420 for the MPfm software application example, one umbrella feature UF of FT is "Repeat music". The code implementation CI related to that UF is a code name "Repeat music implementation" and a comment is found "The code is to implement REPEAT MUSIC" as is the source code. The structured description model (SDM) for this UF is the class name and function name of the source code. If SDM's one class name is "Playback music", D_sdm is "Playback music". A method is then implemented to text match all D_sdm with all UF descriptions of the FT. If it is found that the D_sdm "Playback music" matches the UF—"Playback music" then it is further found that the version of the software also has a feature—"Playback music".

Figure 8:
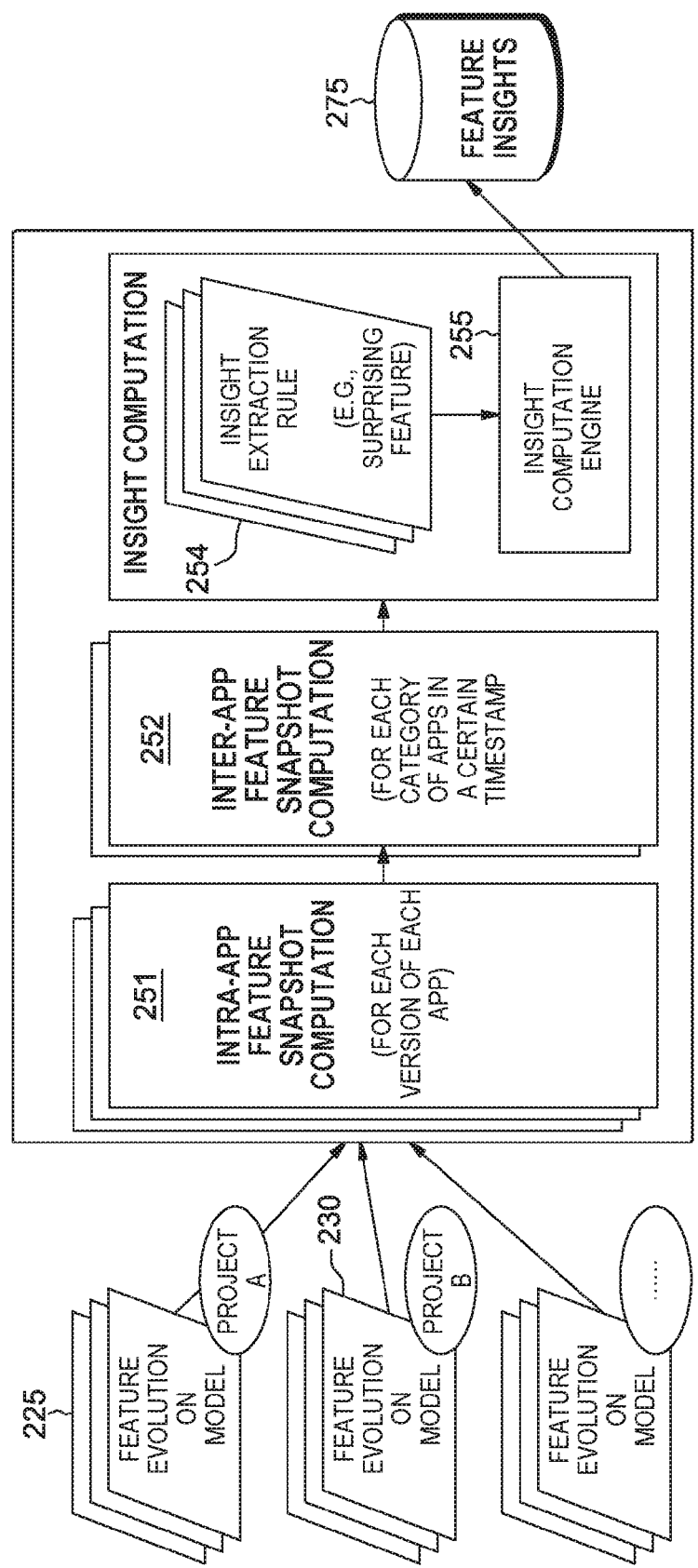
FIG. 8 provides one embodiment of a method implemented by the cross-product feature insight computation module.

Referring back to FIG. 2, there is provided a module 250 including programmed instructions to enable a processor to compute a cross-product feature insight. FIG. 8 provides a method implemented by the cross-product feature insight computation module 250. As shown, module 250 includes a first step to receive the one or more feature evolution models 225, 230, etc. and performs methods for computing insights into cross-product features. FIG. 8 depicts a processing 251 to compute an intra-application feature snapshot computation. This computation is performed for each version of each application (in the example MPfm software program example). Concurrently, or subsequently the system performs a processing 252 to compute an inter-application feature snapshot computation for each category of apps in a certain timestamp.

Figure 8A:
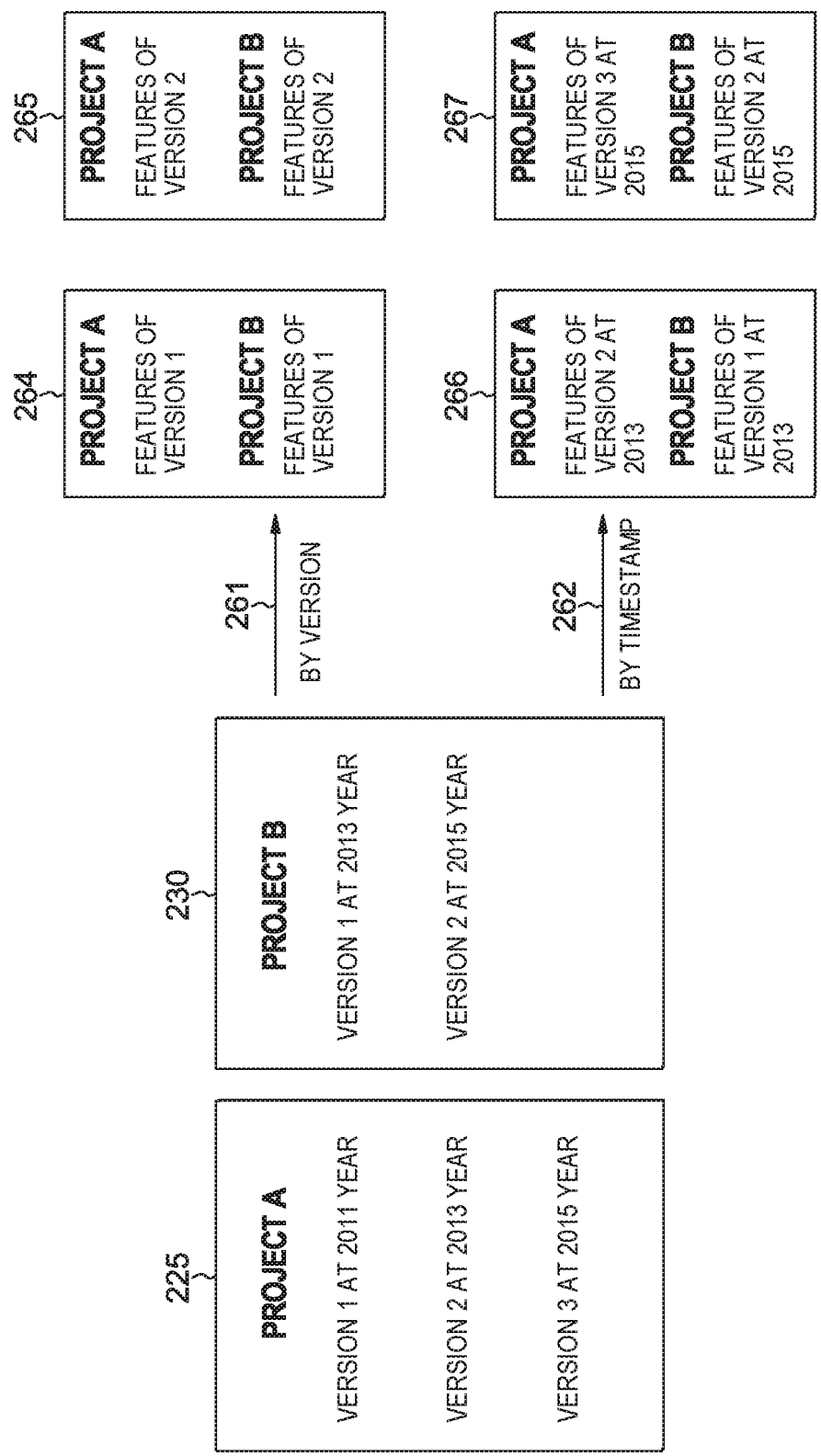
FIG. 8A conceptually depicts the computation for Intra-App Feature Snapshot Computation in which a method clusters according to like software versions in an example implementation.

In one embodiment, an Intra-App Feature Snapshot Computation implements a method to cluster the application features by version or timestamp. FIG. 8A conceptually depicts the computation for Intra-App Feature Snapshot Computation in which a method clusters according to like software versions. For example, based on the example feature evolution model 225 shown associated with the "Project A," and a second feature evolution model 230 shown as associated with the "Project B", methods 261 are implemented to cluster application features by their version. For example, a result of the methods 261 Intra-App feature snapshot computation results in a generated first cluster 264 having features of Version "1" for both Projects A and B. Similarly, the methods 261 results in a generated first cluster 265 having features of Version "2" for both Projects A and B, etc.

As a further example of Intra-App Feature Snapshot clustering, based on the example feature evolution models 225, 230, methods 262 are implemented to cluster application features by their timestamp. For example, a result of the methods 262 Intra-App feature snapshot computation results in a generated first cluster 266 having Features of Version2 associated with a Project A timestamp of 2013 and Features of Version "1" associated with a Project B timestamp of 2013. Similarly, the methods 262 results in a generated second cluster 267 having features of Version "3" associated with a timestamp of 2015 for Project A and having features of Version "2" associated with a timestamp of 2015 for Project B, etc.

Then, further processes include generating an Insight Extraction Rule at 254. Insight computation implements methods to define the rules of every kind of feature, and based on the rules, to extract the corresponding features from the feature clusters generated at the previous "Intra-App Feature Snapshot Computation" step.

An insight computation provides, via a user interface (UI), a display enabling a user to define a rule for a "surprising feature" as, for example: for any feature, after it is introduced, the ratings of ½ (i.e., 50%) of its host apps increases by at least 1. The insight computation will then implement methods to scan all feature clusters to check every feature whether it matches the rule. For example, scanning clusters may determine Music Controller A has introduced a Feature "Repeat Music" of Version 2 release and removed a feature "xxxx" of Version 2 and likewise Music Controller B introduced Feature "Repeat Music" of Version 2, and updated Feature "xxxx" of Version 2. Then, if it is subsequently determined that, for example, a Music Controller A's (e.g., Project A's) version 2's ranking increase by 1, and Music Controller B's (e.g., Project B's)

version 2's ranking also increase by 1, then the introduced feature "repeat music" matches the rule. After the feature is introduced, the ratings of 100% of its host apps increase 1. Thus, the insight computation will identify this feature as a "surprising" feature. Thus, insight computation will discover all kind of features based on different rules.

The generated rule may include an insight relating to a feature, e.g., an insight such as a surprising feature. An example rule may include, for any feature, after it is introduced, the ratings of ½ of its host apps increase at least 1. The insight computation engine is a module implementing methods 255 to generate the feature insight. In one embodiment, features may include but are not limited to: Surprising features, Must-have features, Failure features, Co-occurring features, continuously-improved features and, seldom-but-interesting features.

An example method of computing Surprising features is as follows: For any specific feature, after it is introduced, and utilizing methods as shown in FIG. 4, the method tracks the rating changes of related app versions introducing the feature. If the ratings of most (e.g., >70%) of these app versions increase at least 1, we identify the feature as a surprising feature. For the MPfm software program example, the example music player's surprising feature may include: a search of music lyrics; or a loop playback feature.

An example method of computing Must-have features is as follows: For a category of apps, first identify feature snapshots of the latest versions of these apps. If a specific feature appears in most (e.g., >90%) of the feature snapshots, we identify the feature as a must-have feature. For the MPfm software program example, the music player usually provides the following must-have features: play, stop, resume, suspend music, for example.

An example method of computing Failure features is as follows: For any specific feature, after it is introduced, the method tracks the rating changes of related app versions introducing the feature. If the ratings of most (e.g., >70%) of these app versions decrease at least 1, the system identifies the feature as a failure feature. For the MPfm software program example, an example music player failure feature may include: an Auto download feature.

An example method of computing Co-occurring features is as follows: For a specific feature A, first identify related app versions introducing the feature. Then, retrieve other newly-introduced features of these app versions. If there is another specific feature B that co-introduced by most (>95%) of these app versions, the system identifies the features A and B as a co-occurring feature pair. For the MPfm software program example, an example music player's co-occurring features may include: a play music, and stop music feature; a resume and suspend music feature, or a faster play and slower play feature.

An example method of computing continuously-improved features is as follows: For a specific feature A, if it is improved by a lot (e.g., >40%) of versions of an app A and also such case happens in most of apps under a same category with the app A, the system identifies the feature A as a continuously-improved feature. For the MPfm software program example, an example music player's continuously-improved feature may include a feature providing a music recommendation.

An example method of computing seldom-but-interesting features is as follows: Among apps under a same category, if a feature A is introduced by few (e.g., <5) of these apps but after it is released, ratings of related app versions increase at least 1, the system identifies the feature A as a seldom-but-interesting feature. For the MPfm software program example, an example music player's seldom-but-interesting feature may include: a Wise Auto Shutdown feature.

Returning to FIG. 3, upon receipt of a user query at the on-demand report generation module 290, the framework system may, for each product, generate a list of different insight features, e.g., in a report. An example report may be for a software company to develop a music controller. In the embodiments discussed herein, for example, the generated feature insight report for a proposed music player software product may include, but is not limited to: the following must-have features: e.g., Play, stop, resume, suspend music; the following surprising features: e.g., Search music lyrics and Loop playback; the following failure features: e.g., Auto download; the following co-occurring features: e.g., play music, and stop music, Resume and suspend music, and Faster play and slower play; the following continuously-improved feature: e.g., music recommendations; and a seldom-but-interesting feature: e.g., Wise Auto Shutdown.

Figure 10:
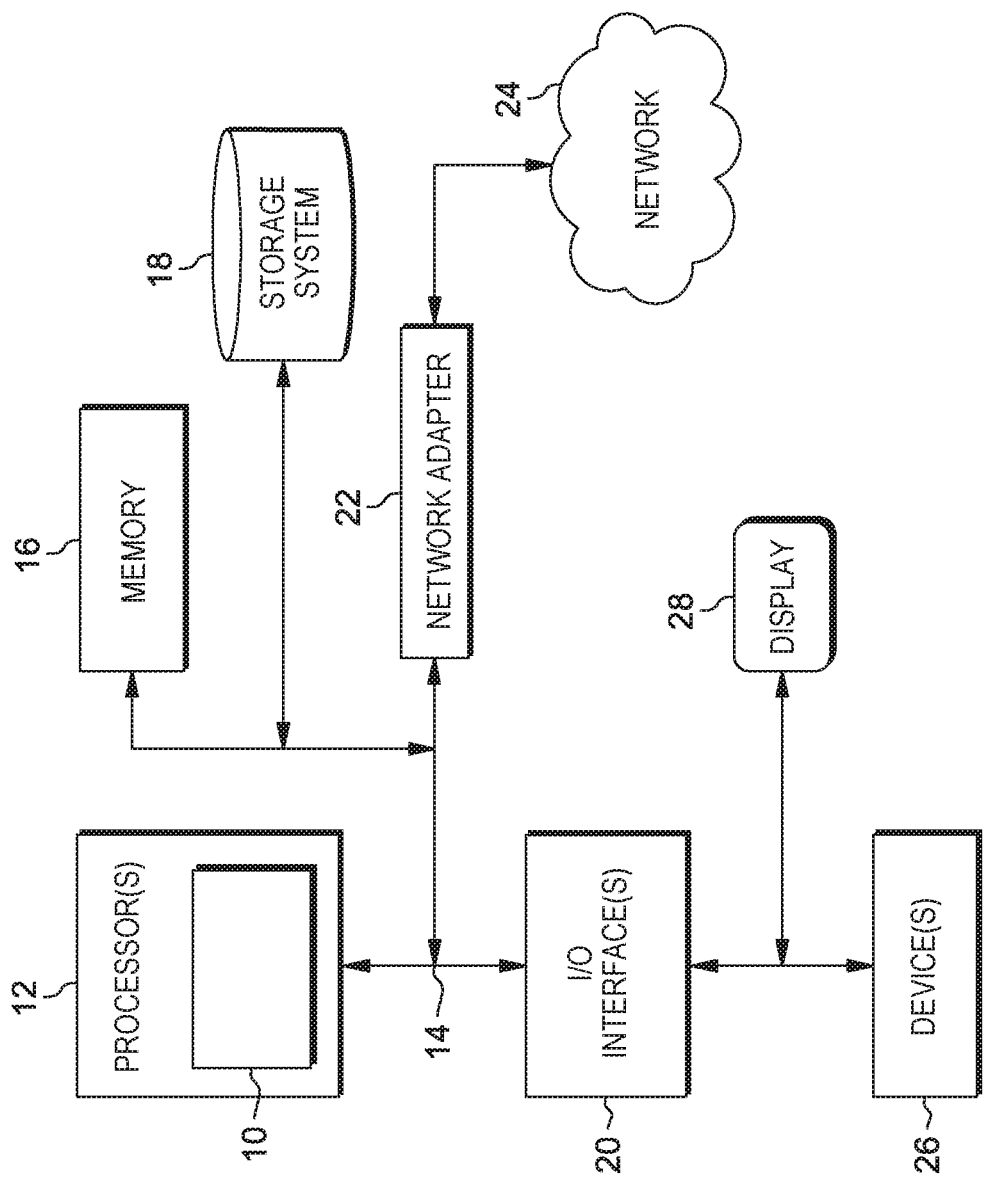
FIG. 10 illustrates a schematic of an example computer or processing system that may implement the cognitive feature analytics framework in the embodiments of the present disclosure.

FIG. 10 illustrates a schematic of an example computer or processing system that may implement the cognitive feature analytics framework in the embodiments of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. An analytics framework module 10 having instructions employing the methods herein may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, and external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for improving features of an application product comprising:
    obtaining, at a programmed processor, data relating to features of an existing application product;
    building, using the programmed processor, a behavior evolution model of said application product based on said features data, said behavior evolution model comprising one of more structured features and a feature's fine-grained relationship with other related entities;
    computing, using the programmed processor, one or more insights for users' preferences based on said behavior evolution model;
    identifying, by the said processor, feature snapshots of the application product by computing an inter-application or intra-application feature snapshots;
    obtaining, by said processor, application name, historical version labels, release timestamps from each released version, and rating information of each version of said application product;
    tracking application versions by linking application versions with said release timestamps and said rating information, wherein said building said behavior evolution model comprises linking features and release versions with change labels, said change labels being labels introduced, deleted or refined;
    extracting, using said processor, feature related description units, said units comprising keywords or structure characteristics;
    identifying, by said processor device, potential umbrella features based on said keywords or structure characteristics;
    generating said low-level features for each potential umbrella feature based on its structurally nearby information;
    determining whether a first umbrella feature contains a lower-level feature which is a same or semantically similar with another umbrella feature, wherein the first umbrella feature and the lower-level feature are the one of more structured features of said behavior evolution model;
    merging the another umbrella feature and the lower-level feature to be a refined lower-level feature of said first umbrella feature; and
    designing a future application product or improving an existing application product based on said one or more computed insights for users' preferences.

2. The method of claim 1, wherein said application product is a software application, said obtaining comprising:
    storing, at a memory storage device, features data relating to said software application, the feature data spanning at least one or more software application versions released over time;
    automatically extracting said stored feature related data of said application product, said stored feature data comprising one or more of: an application description and version release logs relating to said released software application product versions; and
    implementing, by said programmed processor, natural language processing (NLP) applied to said application description and version release logs to identify said one or more structured features, said structured features comprising: umbrella features (UF) and low-level features each release version introduces, improves or deletes.

3. The method of claim 2, wherein said building said behavior evolution model comprises:

utilizing description information and structure of a source code of said application product to evaluate or refine or both evaluate and refine, the identified one or more structured features.

4. The method of claim 3, further comprising: evaluating, refining or both evaluating and refining the identified structured features, said method further comprises:
based on a code implementation CI related to UF, using said processor to collect descriptions of said CI, said description comprising a code name, or a code comment;
based on locations of these descriptions and control flows of CI, generating by said processor, a structured description model (SDM); and
based on the structured description model SDM of CI, validating, by the processor, the corresponding umbrella feature with child features.

5. The method of claim 1, wherein said computing, using the programmed processor, one or more insights for users' preferences comprises:
computing, by said processor, said intra-application feature snapshot for each version of each application from one or more built feature evolution models;
computing, by said processor, said inter-application feature snapshot for each category of applications in a certain timestamp from said one or more built feature evolution models; and
computing, based on said computed intra-application feature snapshot, said computed inter-application feature snapshot, or both said computed intra-application feature snapshot and said computed inter-application feature snapshot, an insight extraction rule relating to one or more feature insights for user preferences to be extracted and generated.

6. The method of claim 5, wherein said computed one or more insights for users' preferences comprises: a surprising feature, a must-have feature, a failure feature, a co-occurring feature, a continuously-improved feature, a seldom-but-interesting feature.

7. A system for improving features of an application product comprising:
a processor and a computer-readable memory coupled to the processor, wherein the memory comprises instructions which, when executed by the processor, cause the processor to:
obtain data relating to features of an existing application product;
build a behavior evolution model of said application product based on said features data, said behavior evolution model comprising one of more structured features and a feature's fine-grained relationship with other related entities;
compute one or more insights for users' preferences based on said behavior evolution model;
identifying feature snapshots of the application product by computing an inter-application or intra-application feature snapshots;
obtain the application name, historical version labels, release timestamps from each released version, and rating information of each version of the application product; and
track application versions by linking versions with release timestamps and said rating information, said building said behavior evolution model comprising linking features and release versions with change labels, said change labels being labels introduced, deleted or refined;
extract feature related description units, said units comprising keywords or structure characteristics;
identify potential umbrella features based on said keywords or structure characteristics;
generate said low-level features for each potential umbrella feature based on its nearby information;
determine whether a first umbrella feature contains a lower-level feature which is a same or semantically similar with another umbrella feature, wherein the first umbrella feature and the lower-level feature are the one of more structured features of said behavior evolution model;
merge the another umbrella feature and the lower-level feature to be a refined lower-level feature of said first umbrella feature; and
design a future application product or improve an existing application product based on said one or more computed insights for users' preferences.

8. The system of claim 7, wherein said application product is a software application product, wherein to obtain, said programmed processor is further configured to:
store, at a memory storage device, features data relating to said software application, the feature data spanning at least one or more software application versions released over time;
automatically extract said stored feature related data of said application product, said stored feature data comprising one or more of: an application description and version release logs relating to said released software application product versions; and
implement natural language processing (NLP) applied to said application description and version release logs to identify said one or more structured features, said structured features comprising: umbrella features (UF) and low-level features each release version introduces, improves or deletes.

9. The system of claim 8, wherein to build said behavior evolution model, said programmed processor is further configured to:
utilize description information and structure of a source code of said application product to evaluate or refine or both evaluate and refine, the identified one or more structured features.

10. The system of claim 9, wherein to evaluate or refine or both evaluate and refine, the identified features, said programmed processor is further configured to:
based on the code implementation CI related to UF, collect descriptions of said CI, said description comprising a code name, or a code comment;
based on locations of these descriptions and control flows of CI, generate a structured description model (SDM); and
based on the structured description model SDM of CI, validate the corresponding umbrella feature with child features.

11. The system of claim 7, wherein the programmed processor is further configured to:
compute said intra-application feature snapshot for each version of each application from one or more built feature evolution models;
compute said inter-application feature snapshot for each category of applications in a certain timestamp from said one or more built feature evolution models; and
compute, based on said computed intra-application feature snapshot, said computed inter-application feature snapshot, or both said computed intra-application feature snapshot and said computed inter-application feature snapshot, an insight extraction rule relating to one or more feature insights for user preferences to be extracted and generated.

12. A computer program product for improving features of an application product, the computer program product comprising a non-transitory computer-readable storage medium having a computer-readable program stored therein, wherein the computer-readable program, when executed on a computer system comprising at least one processor, causes the processor to perform:

obtaining, at a programmed processor, data relating to features of an existing application product; building, using the programmed processor, a behavior evolution model of said application product based on said features data, said behavior evolution model comprising one of more structured features and a feature's fine-grained relationship with other related entities;

computing, using the programmed processor, one or more insights for users' preferences based on said behavior evolution model;

identifying feature snapshots of the application product by computing an inter-application or intra-application feature snapshots;

obtaining the application name, historical version labels, release timestamps from each released version, and rating information of each version of the application product;

tracking application versions by linking versions with release timestamps and said rating information, said building said behavior evolution model comprising linking features and release versions with change labels, said change labels being labels introduced, deleted or refined;

extracting feature related description units, said units comprising keywords or structure characteristics;

identifying potential umbrella features based on said keywords or structure characteristics;

generating said low-level features for each potential umbrella feature based on its nearby information;

determining whether a first umbrella feature contains a lower-level feature which is a same or semantically similar with another umbrella feature, wherein the first umbrella feature and the lower-level feature are the one of more structured features of said behavior evolution model;

merging the another umbrella feature and the lower-level feature to be a refined lower-level feature of said first umbrella feature; and designing a future application product or improving an existing application product based on said one or more computed insights for users' preferences.

13. The computer program product of claim 12, wherein said application product is a software application product, said computer program product further comprising instructions for:

storing, at a memory storage device, features data relating to said software application, the feature data spanning at least one or more software application versions released over time;

automatically extracting said stored feature related data of said application product, said stored feature data comprising one or more of: an application description and version release logs relating to said released software application product versions; and implementing, by said programmed processor, natural language processing (NLP) applied to said application description and version release logs to identify said one or more structured features, said structured features comprising: umbrella features (UF) and low-level features each release version introduces, improves or deletes.

14. The computer program product of claim 12, wherein said computer program product further comprising instructions for configuring said processor to perform:

computing said intra-application feature snapshot for each version of each application;

computing said inter-application feature snapshot for each category of applications in a certain timestamp; and computing, based on said computed intra-application feature snapshot and said computed inter-application feature snapshot, an insight extraction rule relating to one or more various feature insights for user preferences to be extracted and generated, said one or more various feature insights for user preferences comprises: a surprising feature, a must-have feature, a failure feature, a co-occurring feature, a continuously-improved feature, a seldom-but-interesting feature.

* * * * *